N. T. McKEE.
METHOD AND MACHINE FOR WELDING PIPE BENDS.
APPLICATION FILED JULY 15, 1914.
1,173,202.
Patented Feb. 29, 1916.
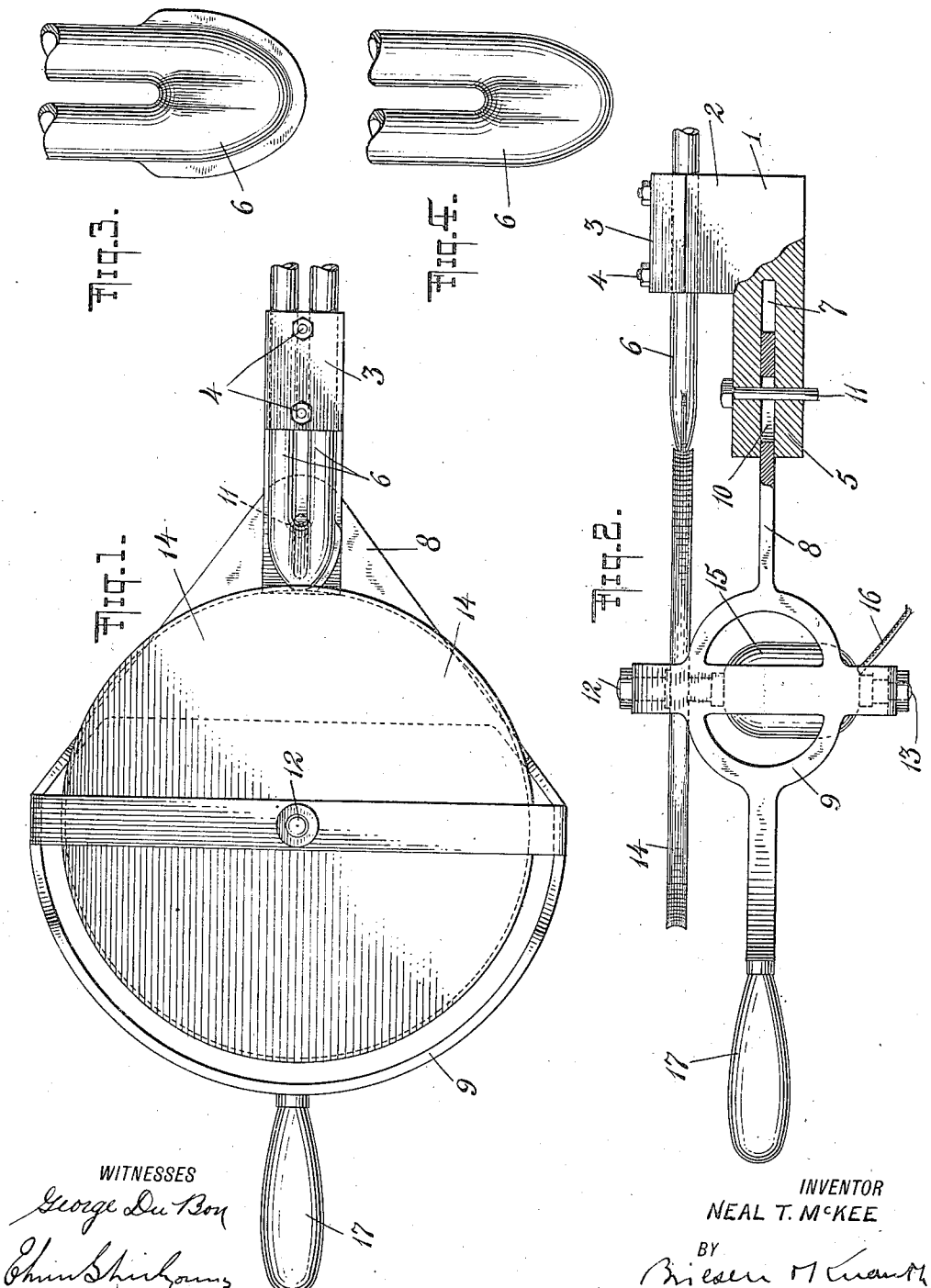
WITNESSES
George Du Bon
INVENTOR
NEAL T. McKEE
BY
ATTORNEYS

UNITED STATES PATENT OFFICE.

NEAL TRIMBLE McKEE, OF DOBBS FERRY, NEW YORK, ASSIGNOR TO LOCOMOTIVE SUPERHEATER COMPANY, OF NEW YORK, N. Y., A CORPORATION OF DELAWARE.

METHOD AND MACHINE FOR WELDING PIPE-BENDS.

1,173,202.   Specification of Letters Patent.   Patented Feb. 29, 1916.

Application filed July 15, 1914. Serial No. 851,055.

*To all whom it may concern:*

Be it known that I, NEAL TRIMBLE MC-KEE, a citizen of the United States, residing at Dobbs Ferry, county of Westchester, State of New York, have invented a new and useful Improvement in Methods and Machines for Welding Pipe-Bends, of which the following is a specification.

My invention relates to a method and machine for welding pipe bends and is particularly useful in the making of some of the welds required in the production of the pipe bend disclosed in application for patent in the United States filed by Charles H. True and myself on April 30, 1914, Serial No. 835,360 and entitled Pipe bends.

In the above referred to application there is disclosed a method and apparatus by means of which two straight pipe lengths are held adjacent to one another, adjacent walls thereof cut, abutted and welded, and the end of the combined pipe lengths as thus united closed by suitable manipulation and welding.

According to the method in the referred to application, after the adjacent walls of the two pipe lengths have been cut, abutted and welded together, the open end of the combined structure thus formed is closed and given a curved contour by suitable dies. The use of these dies results in the production of a fin or flash formed from the surplus wall portions which lie outside of the curve which is to form the outer boundary of the completed bend. This flash is then sheared off and the walls welded together by the use of an oxy-acetylene flame or other suitable welding means.

The above described method of removing the flash and welding the pipe end walls together, while satisfactory as regard operation and quality of weld, is, nevertheless, somewhat slow, tedious and expensive.

It is the object of my present invention to provide a method and means for simultaneously removing the flash and welding the end walls together in a quick, efficient and inexpensive manner.

My invention will be better understood by referring to the accompanying drawings which represent, in a somewhat diagrammatical fashion, a preferred type of machine for carrying out the method of the invention.

Referring to the drawings Figure 1 represents a plan view of the machine as it appears in relation to a pipe bend as the flash is being removed and the welding operation performed; Fig. 2 is a side elevation of Fig. 1; Fig. 3 is a plan view of the incomplete pipe bend, showing the flash to be removed, previous to the welding of the end walls; and Fig. 4 represents the completed pipe bend after the flash has been removed and the end walls welded together.

In the drawings a suitable bracket 1 (supposedly rigidly attached to a solid bed not shown) is provided with a pillar 2 which is grooved to receive the pipes of the incomplete pipe bend; a clamp plate 3, also grooved, holds the pipe lengths firmly in place by the aid of clamping bolts and nuts 4. An extension 5, lying parallel with the axis of the pipe bend 6 is provided with a horizontal slot 7 in which is slidably fitted an arm 8 which forms a part of and projects from an operating frame 9. The arm 8 is provided with a slot 10 and a bolt 11 in the extension 5 passes through said slot.

The operating frame 9 is provided with upper and lower bearings 12 and 13 for a shaft to which is rigidly fixed a solid steel disk 14, having a slightly hollowed periphery. A motor 15 is also attached to the operating frame 9 and the rotor of said motor is fixed to the same shaft that carries disk 14; electrical conductors 16 supply current to the motor.

A handle 17 projects from the operating frame diametrically opposite the arm 8.

The operation of my invention is as follows: With the pipe bend and machine in position as shown in the drawings the motor is started. The handle 17 is then firmly grasped by the operator's hand, and the groove of the disk 14 pressed against the flash of the pipe bend. The flash and contiguous walls of the pipe bends are immediately raised to welding heat and the flash itself burns away. The operating frame is then moved continuously about the pivot bolt 11 so that the disk 14 will contact with every part of the flash from one side of the bend to the other; the pressure against the flash must be maintained while the disk is thus carried about the pivot bolt.

The slot 10 permits the pivoting center of the operating frame to shift in accordance with the requirements.

After the operation has been completed as described the bolts 4 may be loosened, and the clamping plate 3 and pipe bend removed. It will be found that the flash has disappeared and that the end walls of the pipe bend are solidly welded together so that the pipe bend has the appearance shown in Fig. 4.

The disappearance of the flash is thought to be due to the intense heat generated by the friction of the disk 14 against the flash which latter is heated sufficiently to raise the walls of the pipe bend to welding temperature. The pressure of the disk 14 against the end of the pipe bend, at this welding temperature, is sufficient to unite the walls.

The dimensions of the disk 14 and the speed of the motor 15 should be so chosen that the periphery of the wheel will have a travel of from 40,000 to 50,000 lineal feet per minute. At this speed the disk is easily kept cool and does not show any appreciable wear in carrying out the procedure described above.

As previously stated the drawings are of diagrammatic character and the machine is of simple character and intended simply to provide a practical embodiment of the essential principles which must be employed in the construction of a suitable machine.

Instead of rotating the operating frame about the pivot bolt 11 I might, instead, rotate the pipe bend in its own plane so as to bring all parts of the flash in contact with the disk. The essential requirement is that the operating frame and the pipe bend must be rotated relatively to one another.

My invention may be employed not only for welding together pipe bend walls as described but will be found equally useful for welding together any two contiguous sheets or edge portions of metal having a form which permits the contacting, with said edges, of the disk. Hence, various changes of detail may be made within the spirit of the following claims.

I claim—

1. The method of welding together contiguous edges of metal which comprises heating said edges by the friction of a relatively rapidly moving metal member and simultaneously pressing said member and said edges together.

2. Apparatus for welding together contiguous edges of metal comprising a metal member, means for rapidly moving said member in contact with said edges, and means for pressing said member and edges together.

3. Apparatus for welding together contiguous edges of metal comprising a metal disk, means for rapidly revolving said disk in contact with said edges and means for pressing said disk and edges together.

4. Apparatus for removing the flash and welding contiguous edges of an incomplete pipe bend of the type described comprising an operating frame, a rotatable disk carried by said frame, means for rotating said disk, a support for the pipe bend, and means for moving said frame about a center fixed as to said support but movable as to said operating frame.

In testimony whereof, I have hereunto set my hand in the presence of two subscribing witnesses.

NEAL TRIMBLE McKEE.

Witnesses:
R. P. THOMAS,
H. CLAY McKEE.